W. F. DAY.

BURNER.

APPLICATION FILED SEPT. 20, 1915.

Reissued Dec. 14, 1915.

14,030.

2 SHEETS—SHEET 1.

Inventor:
Wilbur F. Day.
by: F. Bradbury
Attorney.

COLUMBIA PLANOGRAPH CO., WASHINGTON, D. C.

W. F. DAY.

BURNER.

APPLICATION FILED SEPT. 20, 1915.

Reissued Dec. 14, 1915.

14,030.

2 SHEETS—SHEET 2.

Inventor:
Wilbur F. Day
by: G. Bradbury
Attorney.

COLUMBIA PLANOGRAPH CO., WASHINGTON, D. C.

UNITED STATES PATENT OFFICE.

WILBUR F. DAY, OF ST. PAUL, MINNESOTA.

BURNER.

14,030. Specification of Reissued Letters Patent. Reissued Dec. 14, 1915.

Original No. 1,130,070, dated March 2, 1915, Serial No. 837,944. Application for reissue filed September 20, 1915. Serial No. 51,738.

*To all whom it may concern:*

Be it known that I, WILBUR F. DAY, a citizen of the United States, residing at St. Paul, in the county of Ramsey and State of Minnesota, have invented certain new and useful Improvements in Burners, of which the following is a specification.

My invention relates to improvements in oil burners adapted to be used in connection with the ordinary construction of wood stoves and ranges, and consists particularly in improved features for better distributing fuel to the burners and the heat from the burners than in the ordinary constructions.

Figure 1:
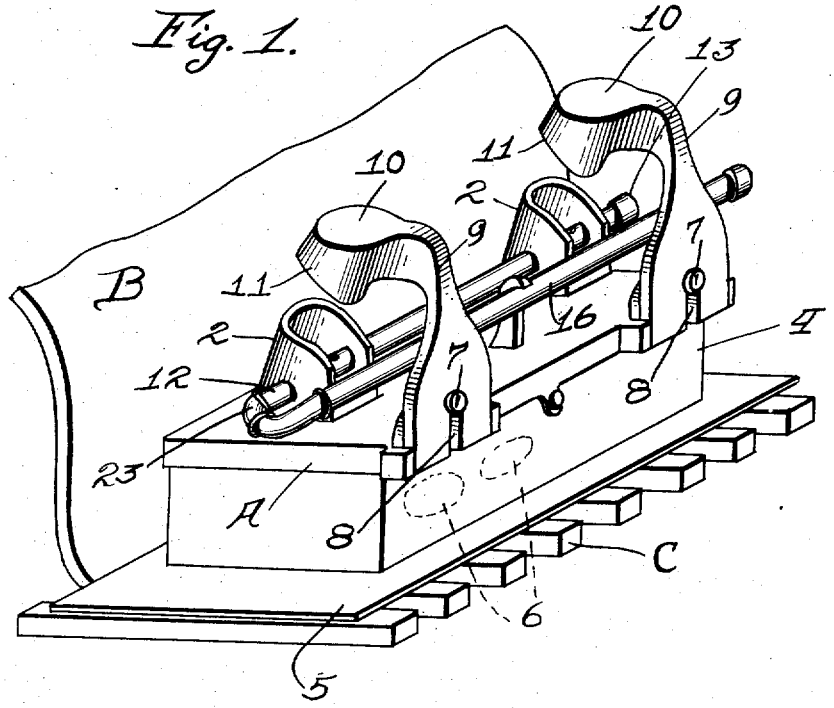
Figure 2:
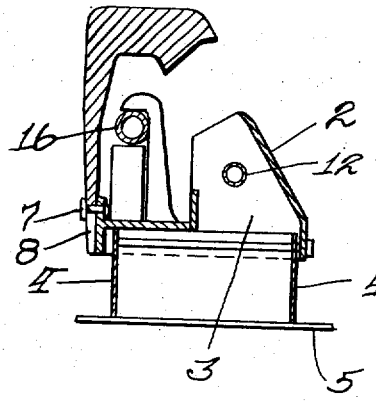
Figure 6:
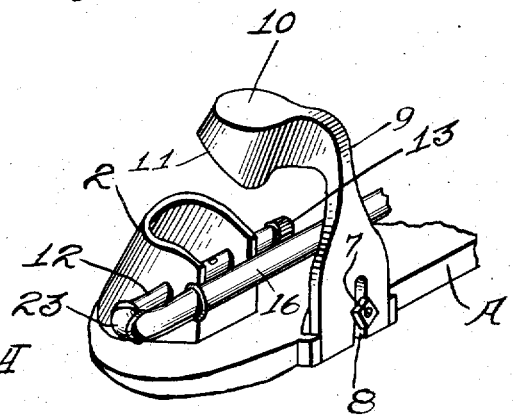
Figure 3:
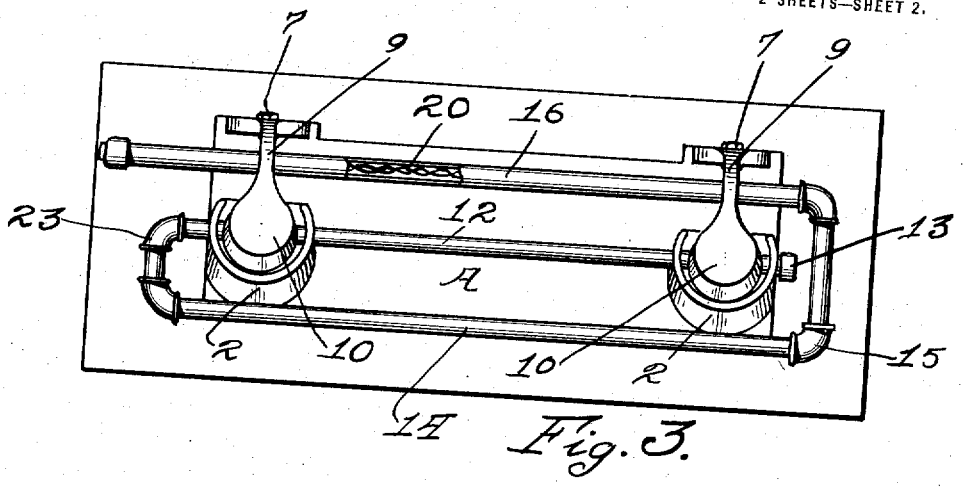
Figure 4:
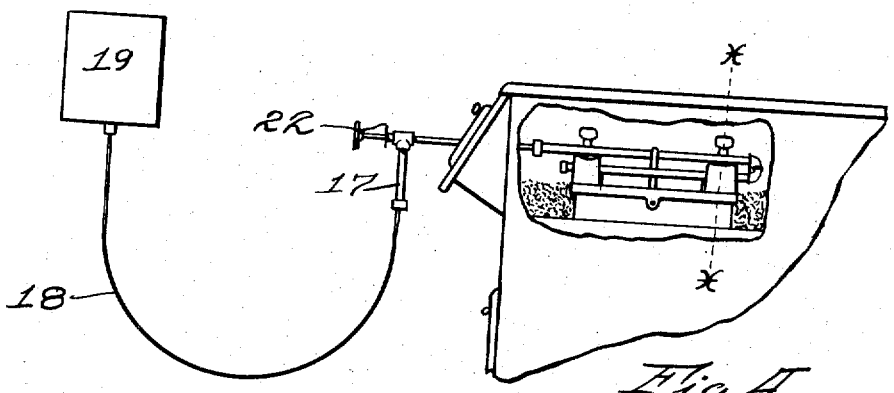
Figure 5:
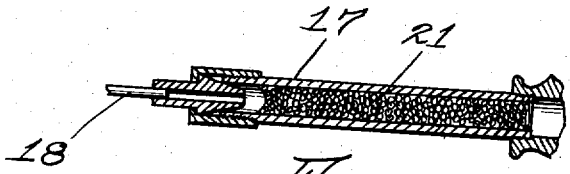

In the accompanying drawings forming part of this specification, Figure 1 is a perspective view of my improved invention shown in position in the fire box of a stove; Fig. 2 is a section on line X—X of Fig. 4; Fig. 3 is a plan view of a modification of my construction; Fig. 4 is an elevation of a range broken away and showing a modification of my construction inside; Fig. 5 is a sectional view of a feed pipe for the fluid, and Fig. 6 is a perspective view of a detail illustrating an alternative construction.

Referring to the drawings B represents the fire box of an ordinary stove or range and C the grate bars thereof, which are shown merely to illustrate one of the uses of the invention.

A represents the supporting base of my device formed with upwardly and forwardly extending conduits 2, the base plate being formed with openings 3 forming the inlets of said conduits.

My device may be supported in the fire box as by means of the supporting box shown in Fig. 2 formed with vertical sides 4 to form a rest for the base, said supporting sides being carried by a horizontal plate 5 adapted to be embedded in the ashes, said plate being formed with air openings 6.

Having vertically adjustable support upon the front of the base plate through the medium of bolts 7 and slots 8 are the upwardly extending spreader standards 9 carrying at their upper ends inwardly projecting spreaders 10. As shown clearly in Figs. 1 and 2 the spreaders are supported in position facing the outlets of the conduits, and the faces 11 of the spreaders are cut at an angle with the outlet ends of the conduits to throw the flame past the conduits and bring about the more direct and efficient heating of the oven. Of course, it will be apparent that the device may be positioned in the oven so as to face the spreaders either forwardly or rearwardly to directly heat the oven back or a front water jacket, as the case may be.

Slidably extending through the conduits is a burner tube 12 having its free end closed by a cap 13 and its other end connected by an elbow 23 to a generator tube 14 extending longitudinally of the fire box, the opposite end of the generator tube being connected by an elbow 15 with a tube 16 extending back through the fire box to the inlet tube 17 connected by a supply tube 18 with a source of supply 19. As will be evident by referring to the drawings, the incline of the spreader faces heretofore referred to will be efficient in the maximum degree in directing the flame against the generator tube.

For the purpose of assisting in regulating the inlet flow of the oil as well as the heat retention qualities of the pipe 16 I arrange in the pipe 16 coiled wires 20. I also preferably fill the inlet tube 17 with gravel 21 or other suitable material to control the pressure and flow of fluid.

In Figs. 1 and 2 I show the pipe 14 left out with the pipe 12 connected by an elbow directly with the pipe 16. Either arrangement of pipe, where desired, may be used without departing from the idea of my invention. A suitable controlling valve 22 is employed in connection with the inlet pipe. The tube 12 extending through the conduits is formed with burner jet openings, which by the sliding of the pipes may be caused to stand either inside the conduits or outside.

In use as shown, the supporting base 5 will stand embedded in the ashes. When it is desired to start the burner the pipes will be withdrawn sufficiently to position the burner jets outside the conduits. The controlling valve then being opened, the oil will flow through the tubing and pass through the jet openings upon the ashes outside the conduits. The valve then being closed and the oil upon the ashes lighted the resulting flame will heat the tubing. When the parts are sufficiently heated the pipe will be moved back to bring the jet openings within the conduits, and the inlet valve then being opened the oil as it passes through the heated tubes will be generated into gas, issuing in the form of gas from the jet openings. The gas from the jet openings passing through the outlet openings from the conduits will strike the spreaders and will be directed by the spreaders past and around the conduits to distribute the heat with reference to the generator pipes and the adjacent oven. The air necessary for the burner jets will pass from underneath the grate upward through the openings in the supporting base plate 5 and through the conduits. The supporting box for the device forms an air supply chamber for the jets.

Obviously it is not necessary that both burners be operated simultaneously, Fig. 6 illustrating the burner tube 12 of sufficient length to supply fuel to one burner constituting my improvement.

In accordance with the patent statutes, I have described the principles of operation of my invention, together with the apparatus which I now consider to represent the best embodiment thereof, but I desire to have it understood that the construction shown is only illustrative and that the invention can be carried out by other means and applied to uses other than those above set forth within the scope of the following claims.

Having described my invention what I claim as new and desire to protect by Letters Patent is:

1. In combination with a fire box, a burner comprising a base suitably supported upon the fire box grating, upwardly and laterally inclined conduits supported by said base, spreaders supported to stand above the outlet openings of said conduits, said spreaders having faces facing downwardly toward the conduits and standing at an angle with the longitudinal axis of said conduits, a burner jet tube longitudinally slidable through said conduits, and means for connecting said tube with a source of fuel supply.

2. In combination with a fire box, a burner comprising a base, conduits extending upwardly from said base and having upwardly discharging outlet openings, spreaders facing downwardly in opposition to the outlets of said conduits, a burner jet tube slidable through said conduits, and a chamber forming a supporting rest for said base, said chamber being connected with the outer air whereby to form an air supply chamber for said burner.

3. A burner, comprising, in combination, a base, an upwardly and laterally inclined conduit supported by said base, a spreader supported to stand above the outlet opening of said conduit, said spreader having a face facing downwardly toward the conduit and standing at an angle with the longitudinal axis of said conduit, a burner jet tube longitudinally slidable through said conduit and means for connecting said tube with a source of fuel supply.

4. A burner, comprising, in combination, a base, a conduit extending upwardly from said base and having an upwardly discharging outlet opening, a spreader facing downwardly in opposition to the outlet of said conduit, a burner jet tube slidable through said conduit and a chamber forming a supporting rest for said base, said chamber being connected with the outer air, whereby to form an air supply chamber for said burner.

In testimony whereof, I have signed my name to this specification in the presence of two subscribing witnesses.

WILBUR F. DAY.

Witnesses:
STELLA L. WASCHENBERGER,
F. G. BRADBURY.

Copies of this patent may be obtained for five cents each, by addressing the "Commissioner of Patents, Washington, D. C."